United States Patent
Cummings et al.

(10) Patent No.: US 7,080,129 B2
(45) Date of Patent: Jul. 18, 2006

(54) SITE SELECTION BASED ON INTERNET PROTOCOL ADDRESS

(75) Inventors: Gregory Cummings, Portland, OR (US); Ajay G. Gupta, Hillsboro, OR (US); Hrishikesh Narasimhan, Hillsboro, OR (US); Reed J. Sloss, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 09/752,648

(22) Filed: Dec. 29, 2000

(65) Prior Publication Data

US 2002/0087725 A1    Jul. 4, 2002

(51) Int. Cl.
*G06F 13/00*    (2006.01)

(52) U.S. Cl. .................... 709/217; 709/218; 709/219

(58) Field of Classification Search ........... 709/200.06, 709/216–19, 224–227, 201–203, 204–206, 709/217–219, 235, 238, 245, 200–6
See application file for complete search history.

(56) References Cited

U.S. PATENT DOCUMENTS

| 6,108,703 | A  | * | 8/2000  | Leighton et al. ............ 709/226 |
| 6,119,171 | A  | * | 9/2000  | Alkhatib ..................... 709/245 |
| 6,269,394 | B1 | * | 7/2001  | Kenner et al. .............. 709/217 |
| 6,304,913 | B1 | * | 10/2001 | Rune .......................... 709/241 |
| 6,335,926 | B1 | * | 1/2002  | Silton et al. ................ 370/351 |
| 6,553,413 | B1 | * | 4/2003  | Leighton et al. ........... 709/219 |
| 6,687,846 | B1 | * | 2/2004  | Adrangi et al. ................ 714/4 |
| 6,766,354 | B1 | * | 7/2004  | Jardin et al. ................ 709/203 |

* cited by examiner

*Primary Examiner*—Zarni Maung
*Assistant Examiner*—Van Kim T. Nguyen
(74) *Attorney, Agent, or Firm*—Blakely, Sokoloff, Taylor & Zafman LLP

(57) ABSTRACT

In one aspect of the invention is a method for selecting a site in a network based on the IP (Internet Protocol) of a requesting system. When a request for data is made from a requesting system, the requesting system's IP address is used to determine if an edge server, that is, a streaming server co-located with the requesting system's Web host, exists for the requesting system. If an edge server for the requesting system exists, then the requesting system receives the requested data from the edge server. If no edge server exists, then the requesting system receives the requested data from a deployment server.

28 Claims, 4 Drawing Sheets

SITE SELECTION BASED ON INTERNET PROTOCOL ADDRESS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Intel Corporation, All Rights Reserved.

FIELD OF THE INVENTION

This invention relates to the field of site selection in a network, and more particularly, to a method of selecting a site to fulfill a request based on the address of a requesting system.

BACKGROUND OF THE INVENTION

One of the problems facing media streaming over the Internet is congestion due to high traffic loads. Packets are often dropped or lost when routers and switches are overloaded with traffic. Dropped or lost packets result in lower performance and lower quality media streams. Since the quality of a media stream has a direct correlation to the number of routers and switches that a media stream must transverse, data streaming architects are faced with the challenge of designing algorithms for finding the nearest streaming server to serve a request from a requesting system.

One technology that has been used to provide the least possible network distance has been to embed a complex set of code in each router in a given network. When a request or data is received at the given network's main server, the server routes the request to the nearest router in accordance with a predetermined set of rules, or metrics. Each nearest router maintains and uses predetermined metrics to route the request to the next nearest router until the nearest streaming server is found. The requesting system can then receive data from the nearest streaming server.

One drawback of this approach, however, is that it is complex, expensive, and can be slow. For each router, complex metrics must be developed and embedded to enable the router to determine where a request is coming from, and where the nearest site for serving the request is located. Based on this information, it routes it to another router until the site nearest to the requesting system is reached. Since each router passes information onto another router, the process of finding a nearest site can be slow. Moreover, since each router must have special hardware for communicating with other routers, the infrastructure for implementing this approach can be very costly.

Another approach has been for a network's main server to utilize a simple round robin metrics and dynamic information (such as which servers are available) to determine which streaming server is to be selected to fulfill a request. One drawback to this approach is that a round robin approach may result in the selection of a streaming server that is not the closest streaming server to serve the request from.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In one aspect of the invention, a site selection method for handling a request for data streams is disclosed. A request for a data stream is made from a requesting system corresponding to an Internet Protocol (IP) address. The request is sent to an operations center for handling. A redirection module in the operations center looks the requesting system's IP address up on a site database that has a list of IP addresses, where each IP address corresponds to an edge server that is the nearest server to the requesting system. If the requesting system's IP address is found on the site database, then the redirection module causes the requested data to be sent from the edge server corresponding to the requesting system's IP address to the requesting system. If the address is not found on the site database, then the redirection module causes the requested data to be sent from a deployment server that employs a non-address based protocol to route the data to a server.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Accordingly, herein, a carrier wave shall be regarded as comprising a machine-readable medium.

Introduction

Figure 1:
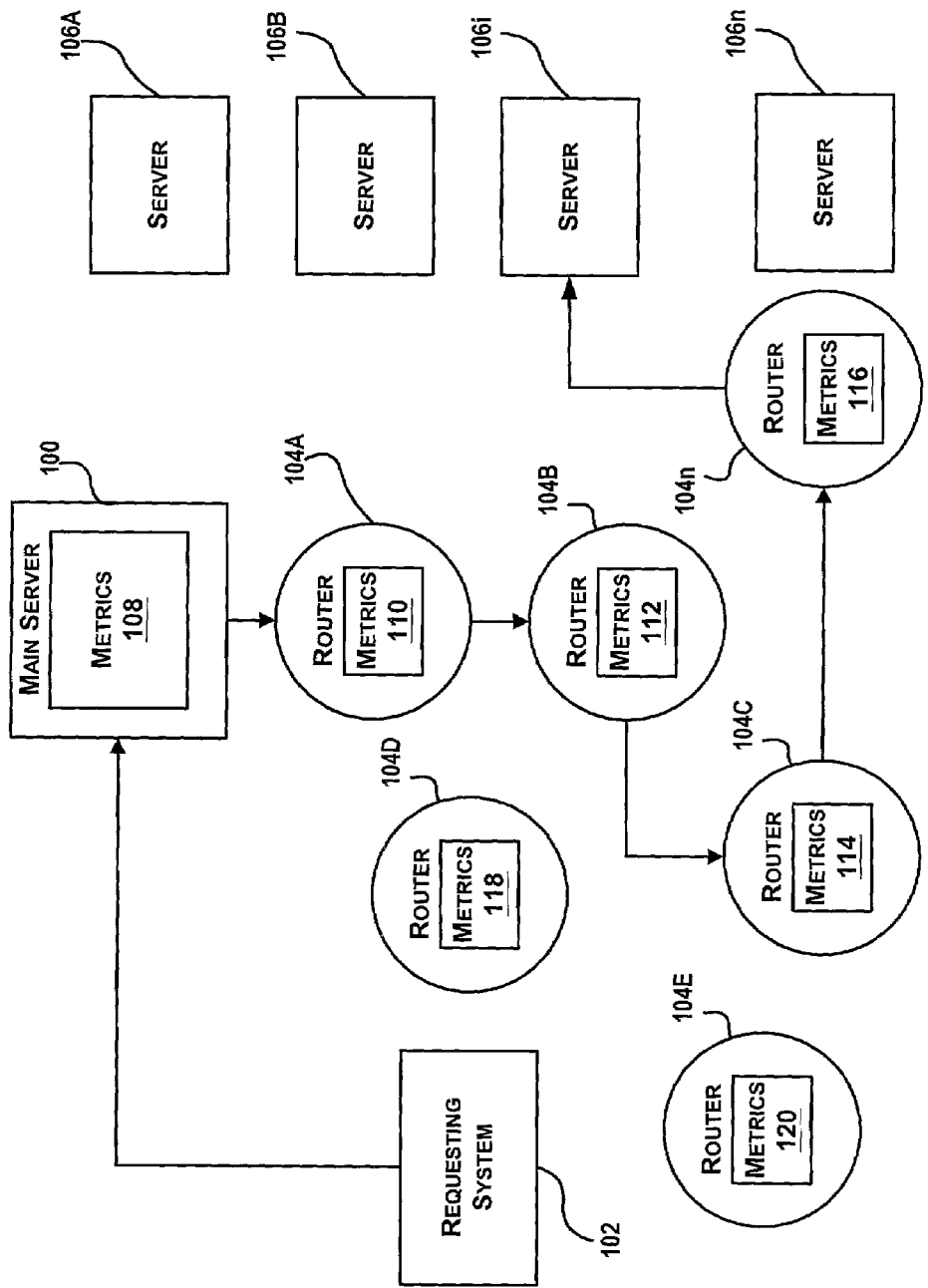
FIG. 1 is a block diagram illustrating a site selection system for handling data streaming requests as currently employed.

One current system for routing a request is illustrated in FIG. 1, where a main server 100 receives a request for data from a requesting system 102. The main server 100 utilizes embedded metrics and dynamic information 108 (where the dynamic information is obtained from the requesting system 102, such as where the request came from), to determine the next nearest router in a pool of routers 104A, 104B, 104C, 104D, 104E, 104n, to route the request to, where n is an integer. Each router also has embedded metrics and dynamically available information 110, 112, 114, 116, 118, 120 (where the dynamic information is obtained from the server 100, or a previous router, such as where the nearest router to the current router is) that enables it to determine the next nearest router. Routers are subsequently selected as next-nearest-routers 104A, 104B, 104C, 104n until an optimal streaming server, 106i in this example, in a plurality of servers 106A, 106B, 106i, 106n is reached.

Figure 2:
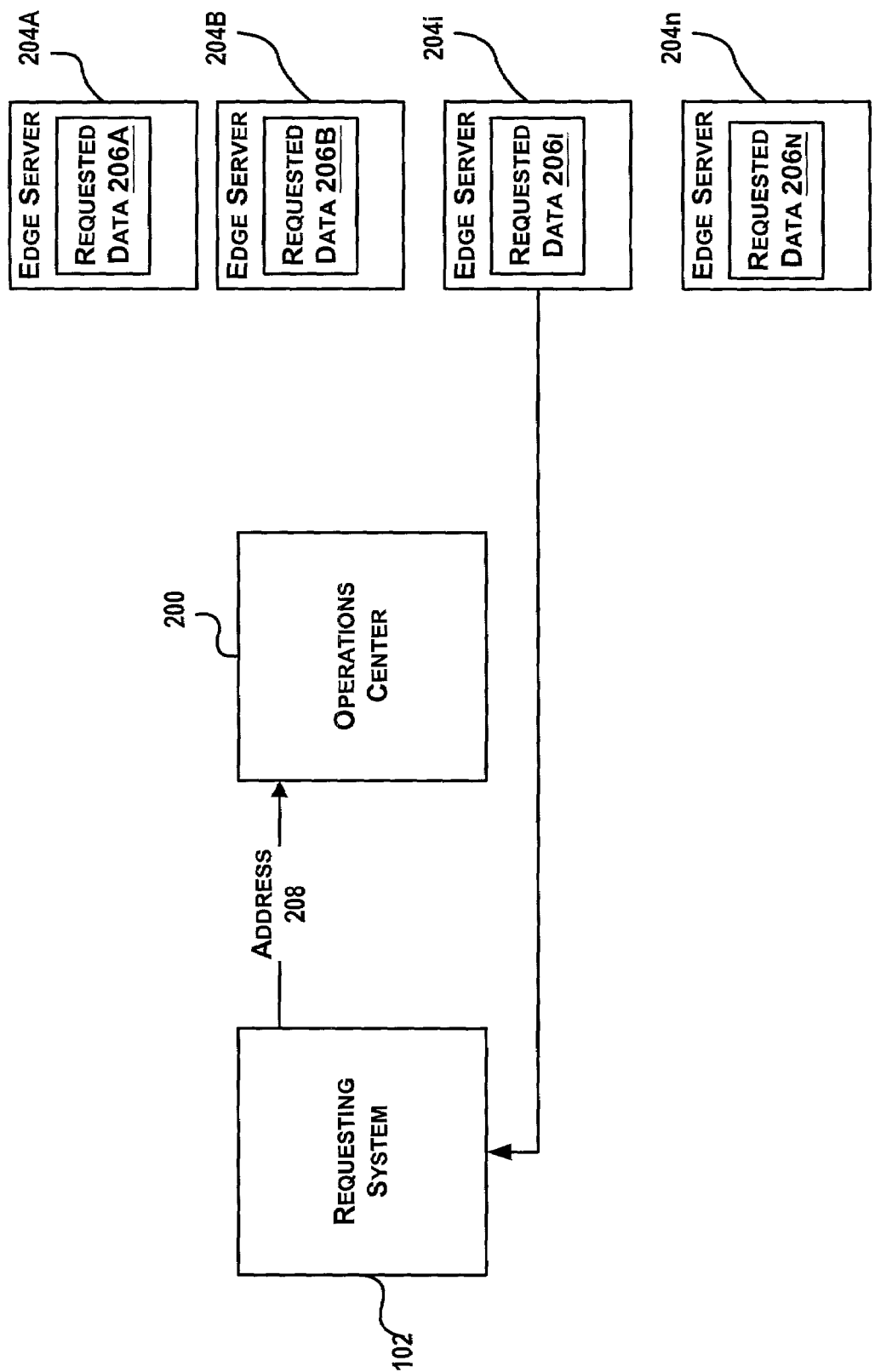
FIG. 2 is a block diagram illustrating a site selection system for handling data streaming requests in accordance with embodiments of the invention.

In embodiments of the invention, as illustrated in FIG. 2, there is no need to route a request from router to router, which, among other things, reduces the risk of a request packet being dropped or lost. In FIG. 2, an operations center 200 receives a request for data from a requesting system 102. Based on the address 208 of the requesting system 102, the operations center 200 selects one of at least one edge servers 204A, 204B, 204i, 204n, each having a copy of the requested data 206A, 206B, 206i, 206n, from which requested data is to be sent. The operations center 200 then causes requested data 206i to be sent from a selected server 204i to the requesting system 102.

Figure 3:
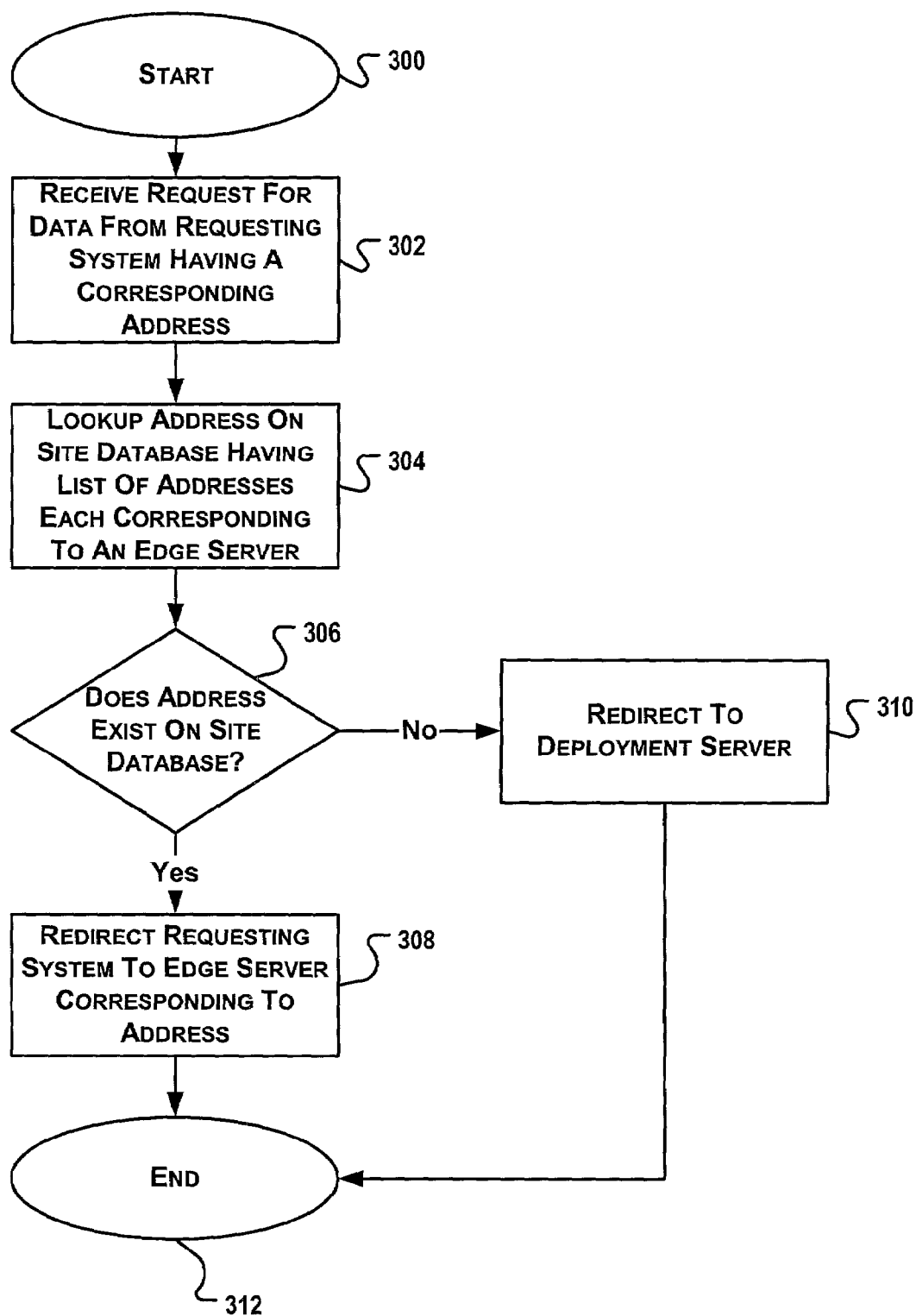
FIG. 3 is a flow diagram illustrating a site selection method for handling data streaming requests in accordance with embodiments of the invention.

FIG. 3 is a flow diagram illustrating the method of FIG. 2. The method begins at block 300, and continues to block 302 where a request for data is received from a requesting system having a corresponding address. At block 304, the address is looked up on a site database. If the address exists on the site database 306, then the requesting system is redirected to a selected edge server corresponding to the address, as determined by the site database, at block 308. If the address does not exist on the site database 306, then the requesting system is redirected to a selected deployment server at block 310, where the selected deployment server is selected based on a protocol that is not address-based. The method ends at block 312.

Terms

As used herein, the following terms are used, and have meanings as follows:

Streaming Server/Site: a server that stores or accepts content, such as media data, and that streams the data to another system. As used herein, streaming servers refer to a group of pre-determined servers for streaming data to a requesting system.

Edge Server: a streaming server that is determined to be the nearest streaming server to a requesting system to satisfy the request of requesting system. The determination is made based on an address of the requesting system. In specific implementations, an edge server comprises a streaming server for streaming data, such as multimedia data. An edge server is a streaming server that is co-located with an ISP or Web Host. For example, an ISP (Internet Service Providers) or a Web (referring to the World Wide Web) host that serves a group of users would serve its users from an edge server. Co-location allows a streaming server to use the facility and bandwidth, for instance, of the ISP or Web host.

Deployment Server: a streaming server that is selected based on non-address based protocols.

Stream: any data transmission, such as the movement of a file between an edge server and a requesting system, that occurs in a continuous flow. Specific embodiments herein refer to a media stream, but the invention is intended to be generally applicable to data.

Operations Center

An operations center processes requests for data sent from requesting systems 102. Data may comprise on-demand events, live events, and scheduled events. On-demand events comprise pre-recorded, stored events, which are accessible at anytime. Live events comprise events that are available on a real-time basis, and scheduled events comprise live events that have been encoded, and are to be broadcasted at a future designated time. Events may be audio and video events; audio events; or video events. Web objects, Web radio, movie trailers, and seminars are examples of data that can be requested and transmitted.

Figure 4:
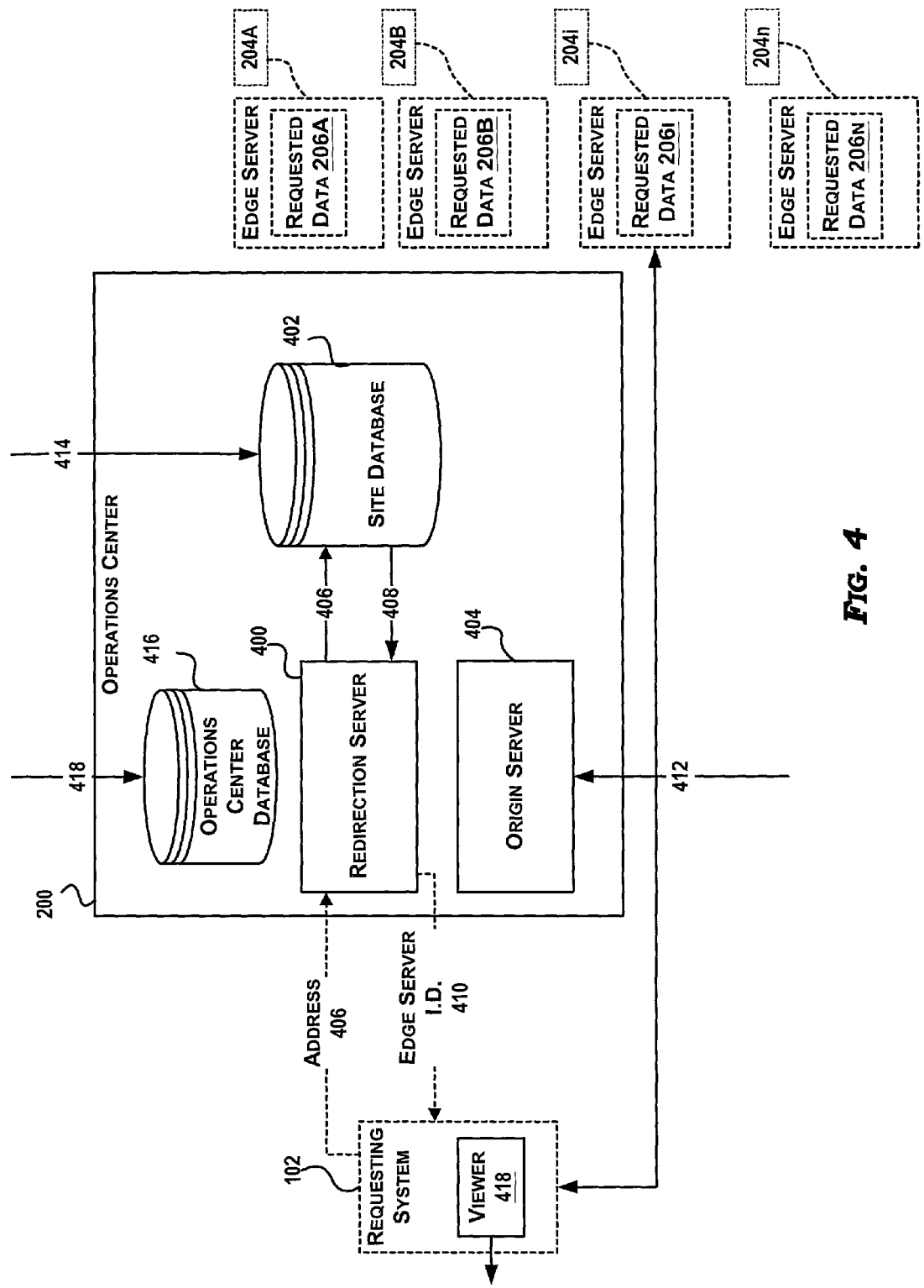
FIG. 4 is a block diagram illustrating an operations center for selecting a site as used in accordance with embodiments of the invention.

As illustrated in FIG. 4, an operations center 200 comprises a redirection server 400, a site database 402, an operations center database 416, and an origin server 404.

Operations Center Database

An operations center database 416 comprises data to be requested, where the data comprises on-demand events. For example, a customer may wish to make a recorded seminar available to users on the Internet. The customer may upload the on-demand data 418 to the operations center 200 by, for example, initiating an upload via FTP (File Transfer Protocol) to the operations center database 416. After the on-demand data 418 has been uploaded to the operations center database 416, a background utility detects the added content, processes the content, makes the appropriate database entries, and marks the content for transfer to streaming servers, so that each streaming server comprises data that has been uploaded to the operations center database 416. As stated previously, streaming servers include edge servers and deployment servers.

Origin Server

An origin server 404 comprises data to be requested, where the data comprises scheduled events, or live events. For example, a customer may wish to make a live seminar (or scheduled event) 412 available to users on the Internet by, for example, transmitting analog A/V (Audio/Video) signals via a satellite reception, which is subsequently encoded; or by transmitting encoded signals over Internet. If the data is encoded, then the data is routed to the origin server 404. If it is not encoded, it is routed to an encoder for encoding (not shown), and then routed to the origin server 404. After the data 412 has been uploaded to the origin server 404, it is ready to be streamed.

When live or scheduled event data is requested, the requesting system 102 is redirected to a selected streaming server (which can be a selected edge server 204i or a selected deployment server), as is done for on-demand event data. However, in the case of live or scheduled data, the selected streaming server requests a connection to the origin server 404, which is receiving the live event or has already received the scheduled event. The origin server 404 then streams data to the selected streaming server. Once the selected streaming server buffers an adequate amount of data, it starts to stream the data to the requesting system 102. The data can then be displayed to the user using a viewer 408 on the requesting system 102.

Site Database

When requests for data are made from a requesting system 102, the requesting system 102 must ultimately receive data from a streaming server. Every system on the Internet must have an IP address. Since IP addresses are assigned by ISPs, which each comprises its own network of routers for routing packets (i.e., data or requests), and servers for sending and receiving data, each requesting system 102, therefore, is associated with a given ISP.

In accordance with embodiments of the invention, rather than stream data from any site in a given network or Internet, it is preferable to stream the data from a streaming server that is co-located with the ISP of the requesting system's 102. Also known as an edge server, which is closer to the requesting system 102 than a server from another ISP server, for instance, it provides a better viewing experience from the requesting system 102. In one embodiment, a site database 402 stores a list 414 of IP addresses and edge servers, where each IP address 406 corresponds to an edge server that has been pre-determined to be the nearest streaming server (which in the best case, is co-located with the requesting system's ISP) to a requesting system 102 of the given IP address 406.

Typically, an ISP is assigned a group of addresses called CIDR (Classless Inter-Domain Routing) blocks, which is nothing more than a contiguous block of IP addresses, such that each edge server corresponds to a CIDR block. In another embodiment, therefore, where CIDR block notation is used in the site database 402, and a particular ISP comprises a large CIDR block (i.e., a contiguous block of numerous addresses), such that it is not feasible to have a single server to serve those IP addresses, it is possible to divide the blocks between servers of the same ISP, and to set up the redirection server 400 and site database 402 to direct a particular request to the best server in the ISP in the same CIDR block. For instance, the redirection server 400 may attempt to first match the IP address 406 to a CIDR block in the site database 402. If there is no CIDR block match, then it can attempt a direct match of the IP address 406 in the site database 402. In this embodiment, the site database 402, therefore, maintains a set of two tables: one for CIDR block matches, and another for IP address 408 matches. If IP address notation is used, then the site database 402 comprises a list of IP addresses, where each one can correspond to the closest edge server for a given ISP.

In exemplary embodiments, there is a one-to-many correspondence between an edge server and an address, where each address has a single nearest streaming server. In other embodiments, however, there may be a many-to-many correspondence between an address and an edge server. In these embodiments, an address may correspond to a plurality of edge servers where, for example, an edge server is busy or it is down, and the request is routed to an alternate edge server. (Where no edge server exists, the request is routed to a deployment server in accordance with a non-address based protocol as determined by the redirection server 400 (see below)).

Redirection Server

A redirection server 400 selects a streaming server for a given requesting system 102, and then redirects a requesting system 102 to a selected streaming server. If an edge server exists and is available, the redirection server 400 redirects the requesting system 102 to a selected edge server. If no edge server is available, then the redirection server 400 redirects the requesting system 102 to a selected deployment server.

EXEMPLARY EMBODIMENT

An exemplary embodiment of the invention is described below in which the invention is used in the context of streaming multimedia data over the Internet. When a requesting system 102 sends a request for multimedia data, the request comprises the requesting system's IP address 406. The request comprising the system's IP address 406 is received by the redirection server 400. The redirection server 400 passes the IP address 406 to the site database 402. If the IP address 406 is found on the site database 402, then a corresponding edge server identifier 408 is passed back to the redirection server 400. The redirection server 400 then redirects the requesting system 102 to the selected edge server 204*i* (identified by the edge server identifier 408). In an exemplary embodiment of the invention, the redirection server 400 returns a streaming metafile 410 to the requesting system 102, where the metafile 410 contains a path to the selected edge server 204*i* (identified by the edge server identifier 408). Using the path, the requesting system 102 then initiates a streaming session with the selected edge server 204*i*, and a viewer 408 on the requesting system 102 streams data to end users. Streaming formats include WMF (Windows Metafile Format), Real Networks®, and Quicktime®, for example, but are not limited to these formats.

If the IP address 406 is not found on the site database 402, then the redirection server 400 uses a protocol for finding an alternate streaming server, called a deployment server for redirecting the requesting system 102 to. A deployment server is selected based on a protocol which is not based on the requesting system's IP address 408. For instance, a round robin, least load, or load-balancing method may be used to select a deployment server.

It should be understood by one of ordinary skill in the art that variations of the exemplary embodiment may exist without departing from the spirit of the invention. For instance, one variation of the exemplary embodiment described above may cause a corresponding edge server identifier 408 to be passed back to the redirection server 400 only if the IP address 406 is found on the site database 402, and if the corresponding edge server is up and running. If either of these fails, then, for instance, an alternate streaming server (i.e., next best edge server, or a deployment server) may be used.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

To the extent not otherwise embodied by prior art, it should be understood by one of ordinary skill in the art that many of the details of the invention described herein are implementation-specific, and are not meant to be limitations of the invention. For example, it is not essential to the invention that a request from a requesting system be for a stream of data. Furthermore, while embodiments discussed herein refer to IP addresses being associated with servers, it should be understood by one of ordinary skill in the art that addresses are not limited to the IP protocol, and that the invention should extend to other protocols appropriate to a given implementation, or other protocols that may be developed in the future to the extent consistent with a given implementation. Those of ordinary skill in the art should also understand that functions performed by modules described herein are not limited to modules associated with a given name, nor is any module limited to the functions described herein. As would be understood by one of ordinary skill in the art, functions described as being performed on multiple processors may, in fact, be performed by less than the number of processors described, or may be performed by a single processor. This list of implementation-specific examples is not exclusive.

What is claimed is:

1. A method comprising:
   receiving a request for data from a requesting system, the request having an address associated with the requesting system;
   receiving an identifier corresponding to the address from an edge server of a plurality of edge servers, the edge server having the requested data;
   selecting the edge server to provide the requested data to the requesting system, wherein the selecting of the edge server includes
      forwarding the address to a database having a predetermined list of addresses corresponding to the plurality of edge servers, and
      looking up the address corresponding to the edge server in the database, wherein the edge server is a nearest streaming server to the requesting system;
   returning a metafile to the requesting system, wherein the metafile includes a path to the selected edge server; and
   directing the requesting system to the edge server to receive the requested data.

2. The method of claim 1, wherein the selecting of the edge server further comprises looking up the address corresponding to the edge server in the database having a predetermined list of CIDR (Classless Inter-Domain Routing) blocks corresponding to the plurality of edge servers, wherein the edge server is the nearest streaming server to the requesting system.

3. The method of claim 1, wherein the address comprises an IP (Internet Protocol) address.

4. The method of claim 1, wherein the request comprises a request for media data.

5. The method of claim 4, wherein the request for media data comprises a request for live media data.

6. The method of claim 5, wherein the directing of the requesting system to the edge server comprises:
   connecting the edge server to an origin server receiving the live media data; and
   sending the live media data from the origin server to the edge server.

7. A method comprising:
   receiving a request for data from a requesting system, the request having an address associated with the requesting system;
   looking up the address using a database, the database having a list of predetermined addresses corresponding to a plurality of edge servers; and
   if the address exists on the database, receiving an identifier corresponding to the address from an edge server having the requested data and is a nearest streaming server to the requesting system, returning a metafile to the requesting system, wherein the metafile includes a path to the selected edge server, and causing the requested data to be sent from the edge server to the requesting system.

8. The method of claim 7, further comprising if the address does not exist on the database, causing the requested data to be sent from a deployment server to the requesting system, the deployment server being selected based on a non-address based protocol.

9. The method of claim 7, wherein the causing of the requested data to be sent from the selected edge server comprises redirecting the requesting system to the selected edge server.

10. The method of claim 9, wherein the redirecting of the requesting system to the selected edge server comprises sending location information to the requesting system, the location information comprising the address of the selected edge server and the location of the requested data on the selected edge server.

11. The method of claim 7, wherein the predetermined addresses are in CIDR (Classless Inter-Domain Routing) block notation having CIDR blocks corresponding to the plurality of edge servers.

12. A machine-readable medium having stored thereon data representing sets of instructions which, when executed by a machine, cause the machine to:
   receive a request for data from a requesting system, the request having an address associated with the requesting system;
   receive an identifier corresponding to the address from an edge server of a plurality of edge servers, the edge server having the requested data;
   select the edge server to provide the requested data to the requesting system, wherein the selecting of the edge server includes
      forwarding the address to a database having a predetermined list of addresses corresponding to the plurality of edge servers, and
      looking up the address corresponding to the edge server in the database, wherein the edge server is a nearest streaming server to the requesting system;
   return a metafile to the requesting system, wherein the metafile includes a path to the selected edge server; and
   direct the requesting system to the edge server to receive the requested data.

13. The machine-readable medium of claim 12, wherein the address comprises an IP (Internet Protocol) address.

14. An apparatus comprising:
   a storage medium; and
   a processor coupled to the storage medium, the processor to
      receive a request for data from a requesting system, the request having an address associated with the requesting system, receive an identifier corresponding to the address from an edge server of a plurality of edge servers, the edge server having the requested data,
      select the edge server to provide the requested data to the requesting system, wherein the selecting of the edge server further includes forwarding the address to a database having a predetermined list of addresses corresponding to the plurality of edge servers, and to look up the address corresponding to the edge server in the database, wherein the edge server is a nearest streaming server to the requesting system, return a metafile to the requesting system, wherein the metafile includes a path to the selected edge server, and direct the requesting system to the edge server to receive the requested data.

15. The apparatus of claim 14, wherein the processor is further to look up the address corresponding to the edge server in the database having a predetermined list of CIDR (Classless Inter-Domain Routing) blocks corresponding to the plurality of edge servers, wherein the edge server is the nearest streaming server to the requesting system.

16. The apparatus of claim 14, wherein the address comprises an IP (Internet Protocol) address.

17. An apparatus comprising:
a database having a list of predetermined addresses corresponding to a plurality of edge servers; and
a redirection server coupled to a database, the redirection server to
receive a request for data from a requesting system, the request having an address associated with the requesting system,
lookup the address on the database, and
if the address exists on the database, receive an identifier corresponding to the address from an edge server having the requested data and is nearest streaming server to the requesting system, return a metafile to the requesting system, wherein the metafile includes a path to the selected edge server, and cause the requested data to be sent from the edge server to the requesting system.

18. The apparatus of claim 17, wherein the predetermined addresses are in CIDR (Classless Inter-Domain Routing) block notation having CIDR blocks corresponding to the plurality of edge servers.

19. The apparatus of claim 17, wherein the address comprises an IP (Internet Protocol) address.

20. A system comprising:
a requesting system to request data, the request having an address associated with the requesting system;
an operations center coupled to the requesting system, the operations center to handle requests from the requesting system, the operations center having
a site database having a list of predetermined addresses corresponding to a plurality of edge servers, and
a redirection module, the redirection module to
receive an identifier corresponding to the address from an edge server having the requested data and is a nearest streaming server to the requesting system,
select the edge server to provide the requested data to the, requesting system, wherein the selecting of the edge server further comprises forwarding the address to the database and to look up the address corresponding to the edge server in the database,
return a metafile to the requesting system, wherein the metafile includes a path to the selected edge server, and
direct the requesting system to the edge server to receive the requested data; and
the edger server of the plurality of edge servers to send data to the requesting system.

21. The system of claim 20, wherein the requesting system comprises a viewer, and the redirection module causing the requested data to be sent from the edge server to the requesting system comprises initiating a dialog session between the viewer and the edge server.

22. The system of claim 20, wherein the address comprises an IIP (Internet Protocol) address.

23. A machine-readable medium having stored thereon data representing sets of instructions which, when executed by a machine, cause the machine to:
receive a request for data from a requesting system, the request having an address associated with the requesting system;
look up the address using a database, the database having a list of predetermined addresses corresponding to a plurality of edge servers; and
if the address exists on the database, receive an identifier corresponding to the address from an edge server having the requested data and is a nearest streaming server to the requesting system, return a metafile to the requesting system, wherein the metafile includes a path to the selected edge server, and cause the requested data to be sent from the edge server to the requesting system.

24. The machine-readable medium of claim 23, wherein the sets of instructions when executed by the machine, further cause the machine to if the address does not exist on the database, cause the requested data to be sent from a deployment server to the requesting system, the deployment server being selected based on a non-address based protocol.

25. The machine-readable medium of claim 23, wherein the causing of the requested data to be sent from the selected edge server comprises redirecting the requesting system to the selected edge server.

26. The machine-readable medium of claim 25, wherein the redirecting the requesting system to the selected edge server comprises sending location information to the requesting system, the location information comprising the address of the selected edge server and the location of the requested data on the selected edge server.

27. The machine-readable medium of claim 23, wherein the predetermined addresses are in CIDR (Classless Inter-Domain Routing) block notation having CIDR blocks corresponding to the plurality of edge servers.

28. The machine-readable medium of claim 12, wherein the request comprises a request for media data.

* * * * *

UNITED STATES PATENT AND TRADEMARK OFFICE
CERTIFICATE OF CORRECTION

PATENT NO. : 7,080,129 B2
APPLICATION NO. : 09/752648
DATED : July 18, 2006
INVENTOR(S) : Cummings et al.

It is certified that error appears in the above-identified patent and that said Letters Patent is hereby corrected as shown below:

In column 10, at line 16, delete "1IP" and insert --IP--.

Signed and Sealed this

Thirtieth Day of October, 2007

JON W. DUDAS
*Director of the United States Patent and Trademark Office*